Aug. 22, 1944.  R. E. RISSER, JR  2,356,273
LIQUID METER
Filed June 26, 1940  7 Sheets-Sheet 1

Fig. 1.

Inventor.
Ross Eugene Risser, Jr.
By Williams, Bradbury & Hinkle
Attys.

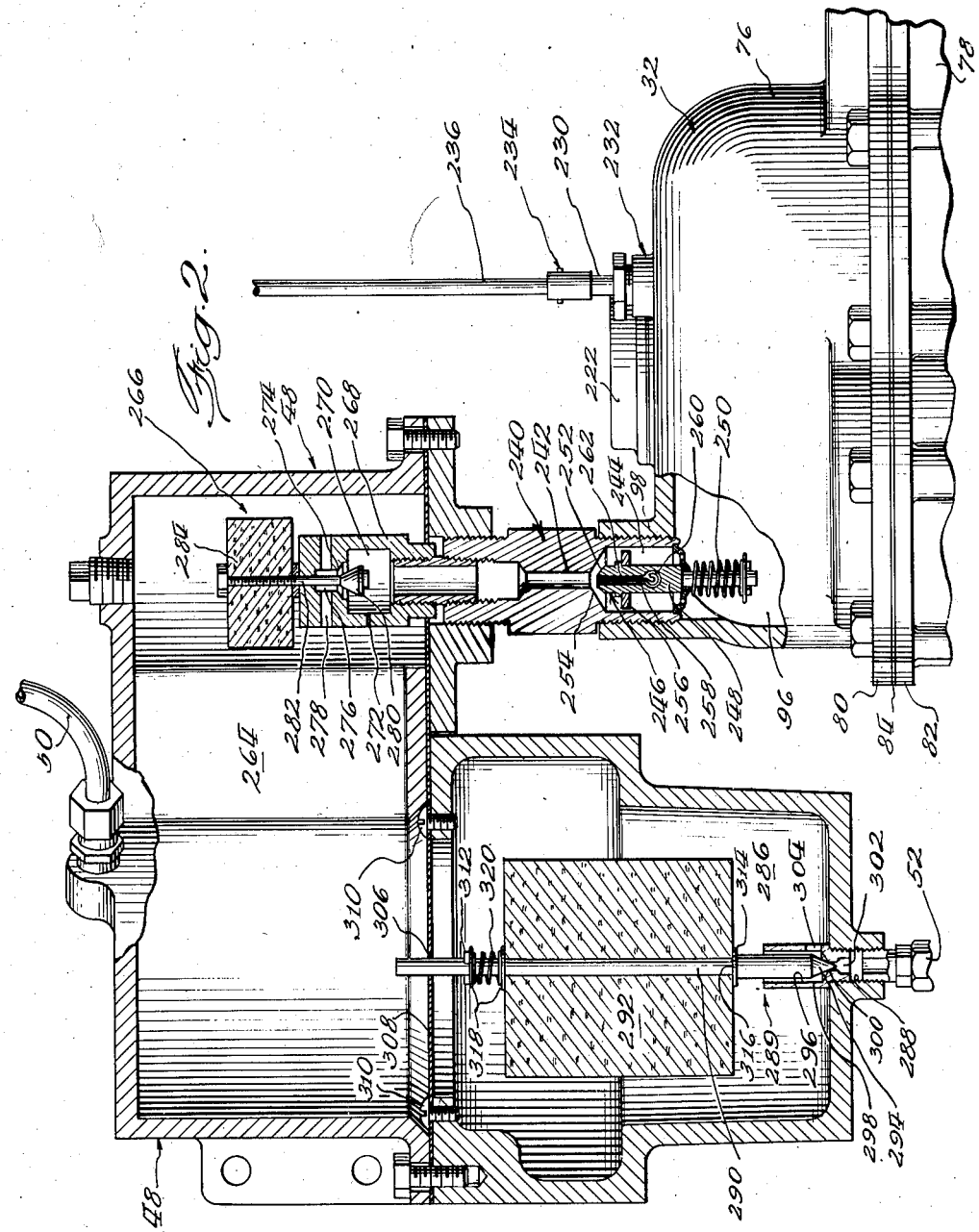

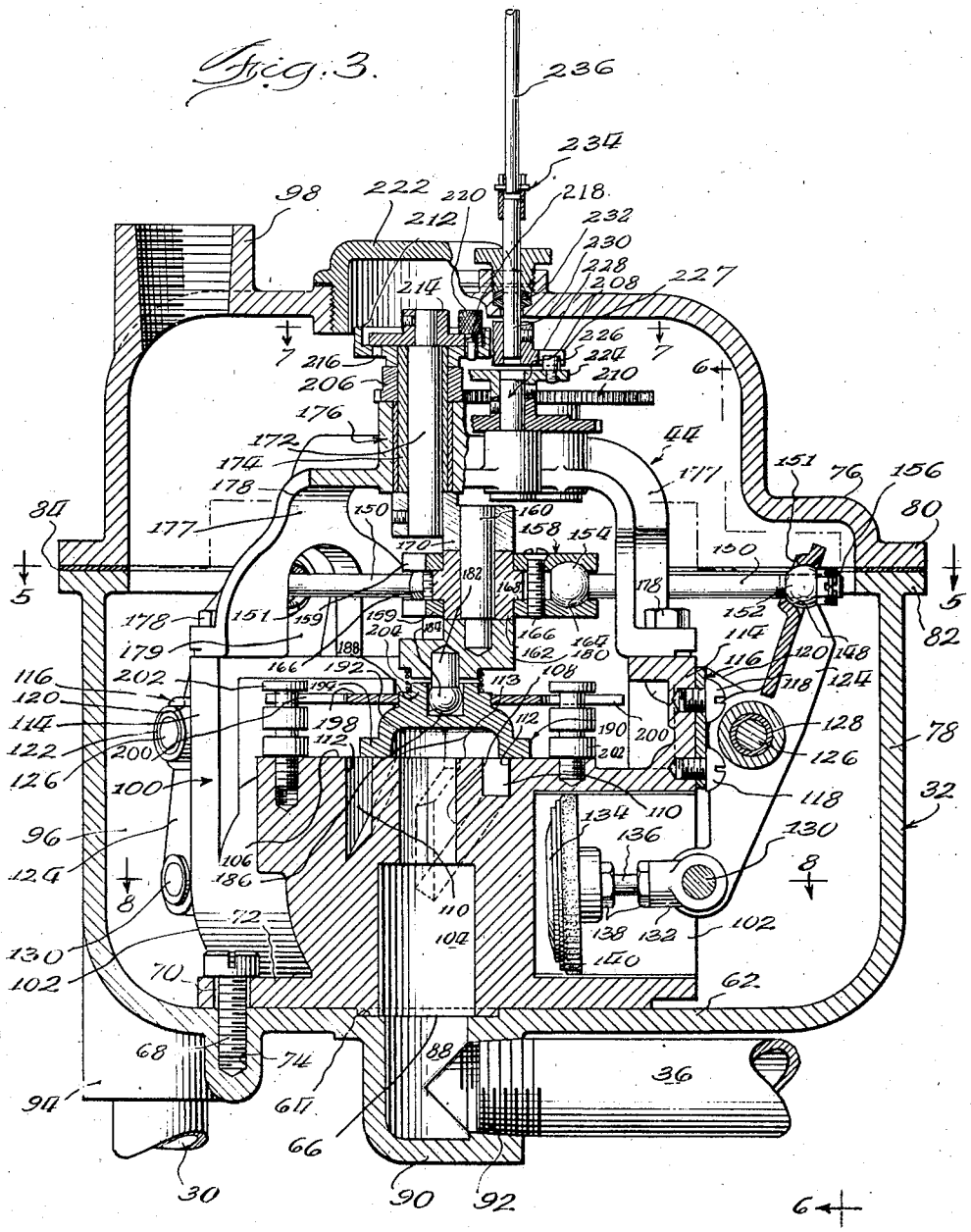

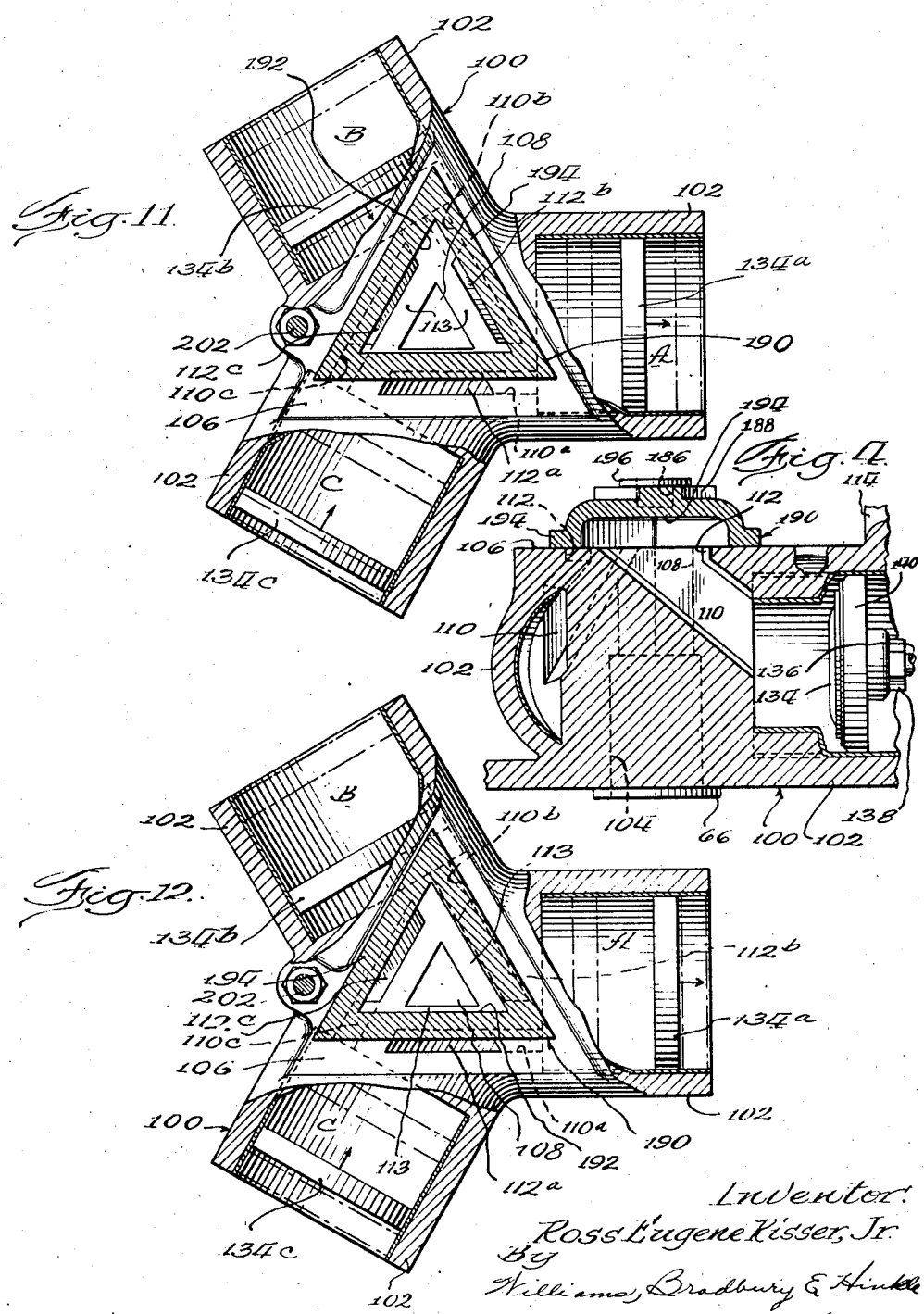

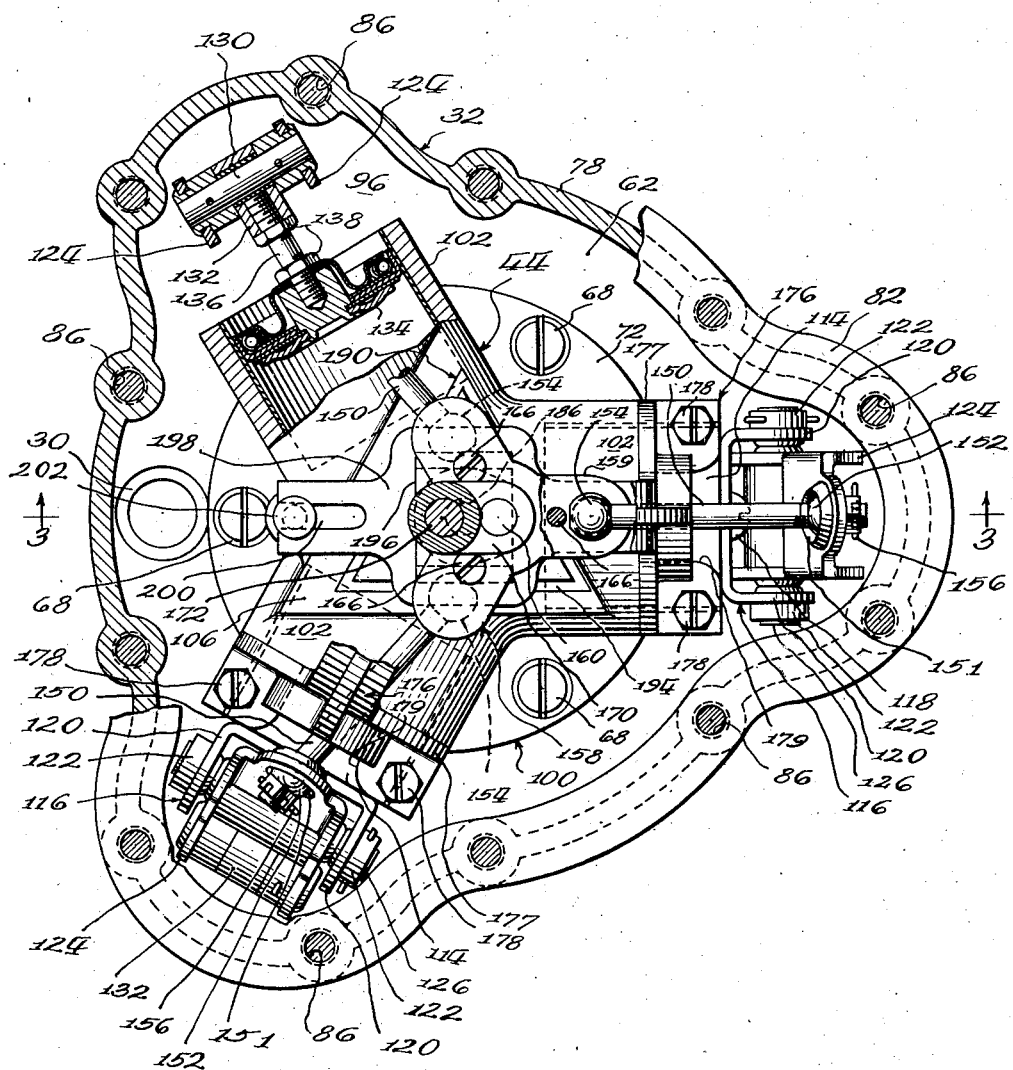

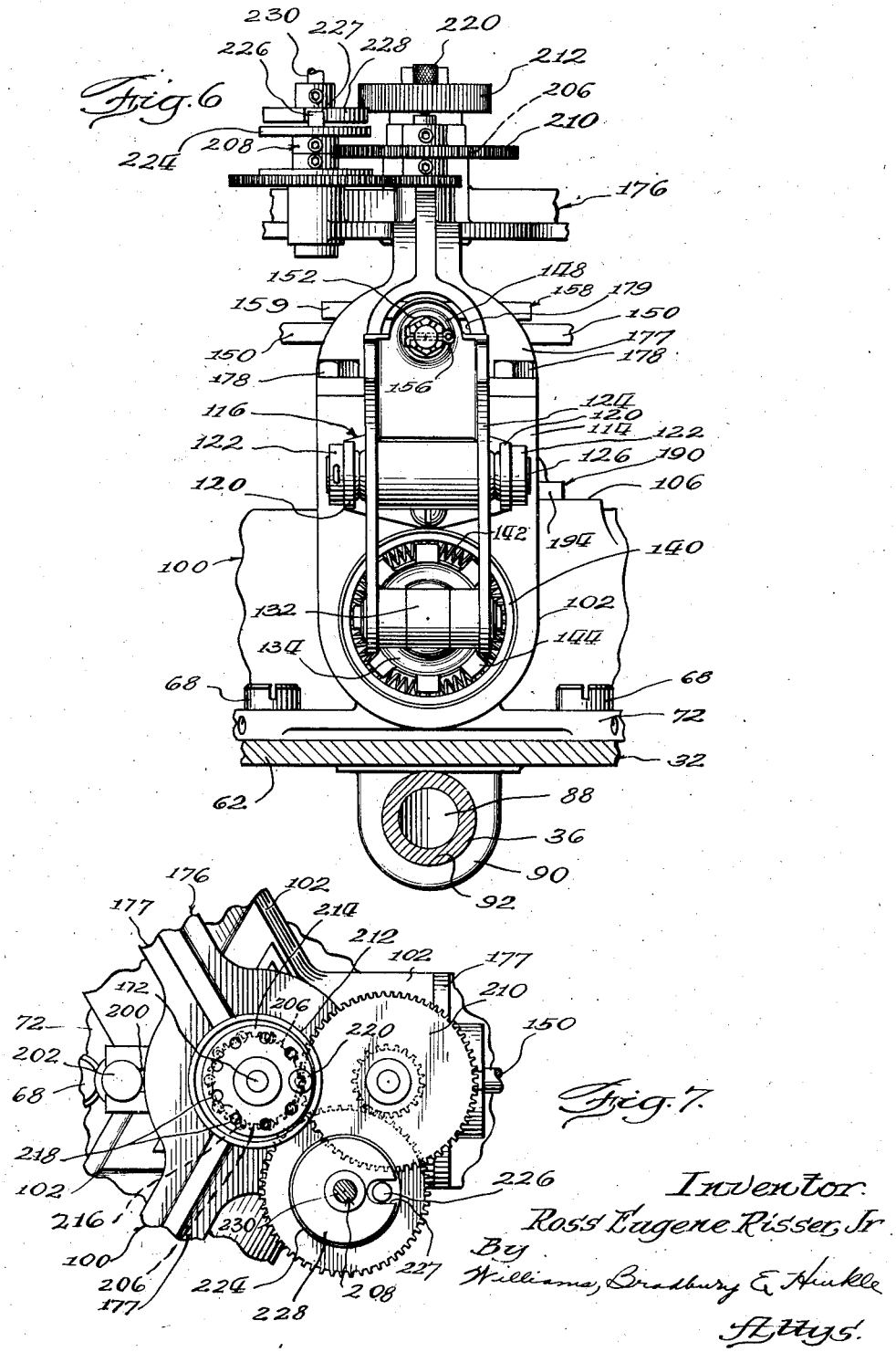

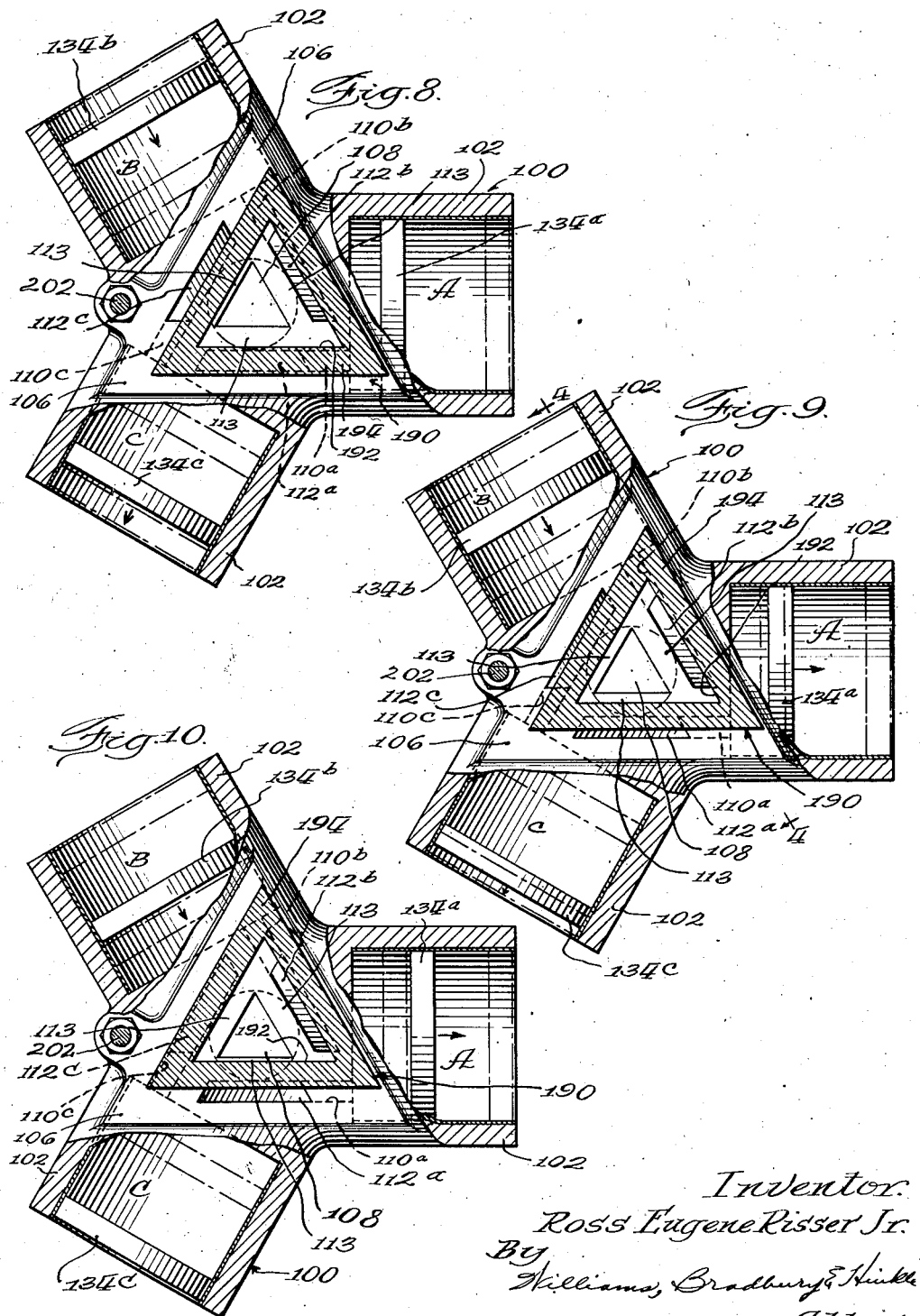

Patented Aug. 22, 1944

2,356,273

UNITED STATES PATENT OFFICE 2,356,273

LIQUID METER

Ross Eugene Risser, Jr., Bonham, Tex.

Application June 26, 1940, Serial No. 342,449

11 Claims. (Cl. 73—247)

My invention relates generally to liquid metering apparatus and more particularly to gasoline measuring apparatus for use in automobile service station dispensing systems.

Briefly, service station dispensing equipment of the type to which this invention particularly applies comprises a storage tank beneath the surface of the ground from which gasoline is pumped to the automobile being serviced. Between the gear pump usually provided for this purpose and the hose nozzle, the gasoline is passed through a liquid displacement meter adapted to measure the quantity of gasoline being dispensed and to drive a recorder which continuously indicates this quantity and frequently the price to be charged therefor. Frequently, also, some arrangement is made to permit air or other gases or vapor mixed with the gasoline to be vented to the atmosphere before the gasoline is passed through the meter.

It is an object of my invention to provide an improved gasoline meter.

Another object of the present invention is to provide an improved gasoline meter that will measure correctly even though the mechanism thereof has become worn to a considerable extent.

More specifically the objects of the present invention include the provision of a novel gasoline meter in which:

(a) Improved valve apparatus and valve action is provided;

(b) A crank shaft is driven through rocker arms and full floating connecting rods;

(c) The connecting rods drive the crank-shaft through tensionally applied forces only;

(d) The construction and arrangement of parts is such that looseness occurring in the crank-shaft driving connections does not introduce lost motion between the several parts;

(e) Improved means are provided for adjusting the meter;

(f) The meter may be adjusted quickly and easily and all of the working parts of the meter are so arranged that they can be removed from the pump as a unit for repair or cleaning and may be inspected to determine the condition thereof without disassembly of the unit;

(g) The parts are so constructed and arranged that the meter mechanism also serves to deaerate the gasoline flowing therethrough;

(h) The meter distributing valve also serves the function of a back pressure surge relief valve;

(i) The condition of the cylinders and pistons may be inspected without disassembly of the unit.

Other objects and advantages will appear from the following description, reference being had to the accompanying drawings, in which:

Fig. 1 is a diagrammatic representation of the mechanism comprising the present invention shown in association with the several elements comprising a service station gasoline dispensing system;

Fig. 2 is a vertical transverse sectional view through a portion of the mechanism comprising the present invention showing the deaerating apparatus;

Fig. 3 is a vertical transverse sectional view of the meter comprising the present invention and may be considered as taken in the direction of the arrows along the line 3—3 of Fig. 5;

Fig. 4 is a vertical sectional view taken along the line 4—4 of Fig. 9, showing one of the cylinders and its associated valve port;

Fig. 5 is a horizontal sectional view taken in the direction indicated by the arrows along the line 5—5 of Fig. 3;

Fig. 6 is a fractional view of the meter showing in end elevation one of the cylinders and its associated mechanism. This view may be considered as having been taken in the direction of the arrows along the line 6—6 of Fig. 3;

Fig. 7 is a fractional view showing the adjusting mechanism and associated apparatus in plan, and is taken in the direction of the arrows along the line 7—7 of Fig. 3;

Fig. 8 is a somewhat diagrammatic representation of the cylinders, the pistons therein and the associated valve mechanism. In general, this view may be considered as taken from above as indicated by the arrows substantially along the line 8—8 of Fig. 3;

Figs. 9, 10, 11 and 12 are views similar to Fig. 8, but show the relative positions of the parts upon successive displacements of the crank-shaft through arcs of substantially 30° in the direction of rotation.

Referring to Fig. 1 of the drawings, a gasoline dispensing system of the type to which the present invention applies comprises a storage tank 10 buried beneath the surface of the ground. The supply of gasoline, indicated at 12, is periodically replenished as needed through a filling spout 14 extending to the storage tank from the surface of the ground. A pipe 16 extends upwardly from beneath the surface of the gasoline, through the top of the tank and is connected at its upper end to a gear pump 18 driven by an electric motor 20 through a V-belt 22. Screens 24 and 26 are provided at the inlet of the pipe 16 and in the pump housing 28, respectively, to prevent dirt and other solid matter from being carried through the dispensing system to the automobile being serviced. From the discharge side of the pump housing 28, the gasoline is forced through a pipe 30 into a meter housing 32. As will appear presently, the gasoline is deaerated while within the meter housing 32, and the gases and air removed from the gasoline passed to the atmosphere by means of suitable mechanism. From the meter housing 32, the gasoline passes to the dispensing nozzle 34 by way of conduit 36, check valve 38, flow indicator 40 and hose connection 42.

A fluid meter 44 is positioned within the housing 32 and is driven by the gasoline flowing therethrough to actuate a registering mechanism 46 adapted to indicate the quantity of gasoline being dispensed and the price to be charged therefor. The air and other gases separated from the gasoline in the housing 32 are passed upwardly into a gasoline recovery device 48 and from there to the atmosphere through a vent tube 50. Within the gasoline recovery device 48, the small quantity of gasoline carried along with the vapor and gases is separated therefrom and conducted back to the intake side 56 of the pump through a drain tube 52.

In the operation of such a system as I have shown, the motor 20 is started, the nozzle 34 is inserted into the filling opening of an automobile gas tank or other receptacle and a manually operated valve 54 opened to permit the flow of gasoline therethrough. Upon opening of the valve 54, the pressure within the system is released so that gasoline can be drawn in through the screen 24, passed upwardly through the pipe 16, through the screen 26, to the inlet side 56 of the pump 18. From here the gasoline is forced through the pump 18 to the pump outlet chamber 58, through the conduit 30 and into the meter housing 32. While within the housing 32, the flowing gasoline drives the meter 44 and passes therefrom through the conduit 36, check valve 38, flow indicator 40, hose connection 42 and thus to the nozzle 34.

The system I have shown is of the wet hose type. That is, the hose 42 and all of the passages previously mentioned are filled with gasoline at all times so that when the valve 54 is opened gasoline flows immediately to the automobile being serviced. The advantage of this type of system is that it is not necessary to drain the hose 42 after filling the automobile gas tank and consequently there is less spilling and waste of gasoline than when the so-called dry hose type of system is used. Also, because no hose draining is necessary, less time is consumed in servicing an automobile.

The flow indicator 40 may be of any well known type and consists usually of a small propeller or turbine journaled within a chamber having a window 60 in one face thereof. This propeller or turbine is revolved by the gasoline passing through the chamber, thus indicating to the purchaser that gasoline is being delivered. The flow indicator 40 is normally provided at the highest point in the delivery system so that any air trapped in the system immediately becomes apparent through the window 60.

The fluid meter 44 shown in detail in Figs. 3, 4, 5, 6 and 7 is constructed as a single unit and rests within the housing 32 and upon the lower surface 62 thereof. The lower surface 62 of this housing is comparatively flat and is provided near its center with an annular seat 64 adapted to receive a complementary nipple 66 provided on the lower surface of the meter. Thus in installing the meter within the housing, it is necessary merely to place the meter upon the lower surface of the housing with the nipple 66 inserted into the seat 64. When in this position, three cap screws 68 extend through circumferentially arranged holes 70 in a flange 72 at the lower end of the meter and are screwed into aligned threaded openings 74 extending into the floor of the meter housing. The housing itself is constructed of upper and lower shells 76 and 78. These shells are provided with complementary flanges 80 and 82, respectively, which are brought into abutting relationship with a suitable gasket 84 therebetween. When in this assembled relationship, the two housing sections are held together by means of a plurality of cap screws extending through spaced holes in the upper flange 80 and into aligned threaded openings 86 in the lower flange 82.

The seat 64 in the bottom portion of the housing communicates through a bore, or cored opening 88, extending into a boss 90 formed integrally with the lower shell. A threaded opening 92 extends through the side of this boss and receives the outlet pipe 36. The inlet pipe 30 is threaded into a boss 94 formed at the lower edge of the lower shell and communicates with a cored opening extending upwardly into the chamber 96 formed within the housing 32. Thus with the meter installed within the housing, the inlet pipe 30 communicates with the space within the housing surrounding the meter 44, while the outlet pipe 36 communicates with the nipple 66 of the meter. The chamber 96 also communicates through a hollow threaded boss 98 formed at the top of the housing with the gasoline recovery apparatus 48. It is through this latter apparatus that gases and vapor separated from the gasoline by the deaerating function of the meter housing pass to the atmosphere.

The meter 44 comprises a three cylinder radial fluid motor the principal element in the construction of which is a casting which will be referred to as the frame 100. The lower portion of this casting is provided with the flange 72 previously described as being adapted to rest upon the lower interior surface of the shell 78 and having a nipple extending into the outlet opening 88 of the shell. Cast integrally upon the upper surface of this flange are three radially arranged cylinders 102 having their inner ends disposed around a generally cylindrical vertical outlet passage 104, leading downwardly to the outlet opening 88.

The central portion of the frame 100 above the cylinders 102 is provided with a flat horizontal face 106. This face has the shape of an equilateral triangle formed by the intersection of the face with three vertical planes, each of which is parallel to the axis of one of the cylinders and spaced toward the left edge of the respective cylinder when viewed from the open end of the cylinder. A triangular outlet port 108 is formed in the center of the triangular face 106 with its edges parallel to the adjacent edges of the surface 106. This triangular outlet port extends downwardly through the casting and communicates with the outlet passage 104.

Each of the cylinders 102 is closed at its inner end excepting that each has a passage 110 leading therefrom and communicating with a port 112 in the face 106. Each of these ports 112 is shaped as a trapezoid and is arranged with its upper and lower bases parallel to the adjacent edge of the triangular opening 108 and parallel to the axis of the cylinder communicating therewith through its respective passage 110. The portions of the face 106 between the port 108 and ports 112 will be referred to as ribs 113. As will be explained more fully later, the face 106 having therein the ports 112 and 108 forms a valve seat in contact with which a slide valve moves to distribute gasoline to the several cylinders in succession and from the several cylinders to the outlet passage 104.

The outer ends of the cylinders 102 are open to the space inside of the housing 32. At the end of each of these cylinders the frame 100 is provided with upwardly extending vertical pillars 114 which carry U-shaped rocker arm pivot brackets 116. Each of these brackets has the flat central portion of the U secured against the outward vertical face of one of the pillars 114 by means of screws 118 extending into threaded openings in the frame through aligned openings in the brackets 116. These brackets have outwardly extending parallel ears 120 provided with bosses 122. A rocker arm 124 extends vertically between the ears 120 of each of the brackets and is journaled near its center upon a pin 126 extending through aligned holes in the bosses 122. Preferably the rocker arm is provided with a bronze bushing 128 where it bears against the pin 126. The lower end of the rocker arm is forked and provided with a pin 130 parallel to the pin 126 and extending through a bronze bearing in a short piston rod 132 connected at its opposite end to a piston 134.

The central portion of this piston rod consists of a rod 136 threaded at its opposite ends into the piston and bronze bearing member. This arrangement accomplishes adjustability of the length of the piston rod 132, since the threaded rod 136 may be provided with lock nuts 138, which may be tightened after the ends of the rod have been threaded, respectively, into the piston and bearing member.

Each of the pistons 134 is provided with a leather cup washer 140 urged outwardly against the face of the cylinder by means of an annular coil spring 142 underlying the inner face of the cup washer and maintained in place by outwardly radiating fingers 144 formed upon the rearward surface of the piston. Thus good contact is at all times assured between the cup washer and the inner surface of the cylinder.

The metal at the upper end of the rocker arm 124 is formed with a spherical indentation, thus providing a socket 148 in the outward face thereof. A connecting rod 150 extends through an opening 151 in the center of the socket and is provided at its outward end with a ball 152 adapted to seat in the socket 148. This connecting rod extends inwardly substantially horizontally and is provided at its inner end with a similar ball 154. Preferably the inner ball 154 is formed rigidly upon the connecting rod 150, such as by threading the ball upon the shaft and then peening over the end of the shaft to prevent relative movement therebetween, while the outer ball 152 is threaded upon the rod to provide adjustability of the effective length of the connecting rod. The outer ball is provided with a castellated head so that it may be locked in place by means of the cotter key 156 extending through a transverse hole in the end of the connecting rod. The inner balls 154 of all of the connecting rods are connected together by a spider 158 journaled at its center upon a crank pin 160.

This spider 158 is formed from two flat plates of bearing bronze 159 spaced apart by a collar 162 so that the distance between the plates is slightly greater than the diameter of the connecting rods 150, but considerably less than the diameter of the balls 154. Each of these plates is provided with complementary spherical indentations or sockets 164 at the ends of outwardly radiating arms to embrace the balls 154. These sockets are preferably formed by pressing a ball into the face of the metal under heavy pressure rather than by a machining operation. I prefer that these sockets 164 as well as the sockets 148, be formed in this manner, because the working of the metal brought about by forcing the ball tool thereinto hardens the metal to a considerable extent in this area and thus improves its wearing qualities.

After the balls 154 are in place in the complementary sockets 164 the two plates 159 of the spider 158 are held together by means of screws 166 extending between the plates and which urge these plates against a shoulder 168 of the collar 162. Thus, the collar 162 and the two plates 159 of the spider 158 are held rigidly together to form a member which is adapted to rotate upon the crank pin 160 while permitting limited free pivotal movement of the connecting rods 159 relative thereto in any direction.

The upper end of the crank pin 160 is connected to an upper crank cheek 170 of a crank shaft 172. This crank shaft extends through a quill shaft 174 which in turn is journaled in the central portion of a spider casting 176. For a purpose that will appear presently, the internal surface of the quill shaft 174 is eccentric to the external surface journaled in the spider 176. The spider 176 has three legs 177 extending outwardly and downwardly and secured to the top surface of the vertically extending pillars 114 by cap screws 178. The lower ends of the legs 177 are forked at 179 to straddle the connecting rods 150 to permit free movement of these members.

The lower end of the crank pin 160 is secured to a lower crank cheek 180 provided with a downwardly projecting pin 182 offset slightly from the axis of rotation of the crank shaft. This pin has a ball shaped end 184 fitted to a cylindrical recess 186 in a boss 188 formed upon the top surface of a slide valve 190. As the crank shaft revolves, this pin serves to move the valve 190 in an orbital manner upon the valve seat formed upon the face 106 previously described.

The slide valve 190 is formed as an equilateral triangle with its external dimensions slightly greater than the triangle that would be formed upon the valve seat 106 by extending the longer bases of the trapezoidal ports 112 to their points of intersection. The lower surface of the slide valve 190 has a triangular recess 192 which in conjunction with the external edges of the slide valve forms three intersecting ribs 194 slightly wider than the ports 112. The lower faces of these intersecting ribs 194 are preferably lapped in contact with the valve seat 106 to insure a liquid tight seal between the valve elements.

To prevent the slide 190 from turning as it is moved in an orbital manner, the boss 188 is provided with parallel vertical edges 196 fitted within a scotch yoke 198 and adapted to permit linear movement of the valve transversely relative to the yoke, while the yoke has longitudinal slots 200 at its ends through which screws 202 extend into the frame casting 100 to permit longitudinal movement of the yoke relative to the casting 100. This arrangement is best shown in Figs. 3 and 5. The slide valve 190 is held in face to face contact with its seat 106 by a coil spring 204 positioned around the pin 182 and bearing with its opposite ends respectively against the upper face of the slide 190 and the crank cheek 180. This expedient for insuring fluid tightness of the valve parts also enables the valve to act as a reverse flow surge relief valve as will be explained more fully later.

The upper end of the quill shaft 174 where it projects above the spider 176 extends through and is keyed to a pinion 206. This pinion drives a register drive 208 through a reduction gear train 210. Although the reduction ratio of this gear train depends upon the volume of liquid displaced during each revolution of the meter crank shaft and the gearing within the register driven by the meter, the particular meter shown in the drawings has a reduction such that five revolutions of the quill shaft 174 cause one revolution of the register drive 208.

Above the pinion 206, the quill shaft is secured to an adjustment driven disc 212, while the crank shaft 172 extends beyond the end of the quill shaft and is secured to a similar drive disc 214. These two discs are arranged in face to face contact and are perforated around a circumferential line with the driven disc 212 having ten equally spaced holes 216 and the drive disc 214 having nine equally spaced threaded holes 218. With this arrangement, the quill shaft can be set relative to the crank shaft in any one of 90 positions and the two discs 212 and 214 secured together by a threaded pin 220 screwed into one of the holes 218 and extending into one of the holes 216 in the driven disc 212. The relative positions of the crank shaft and quill shaft determine the effective throw of the crank shaft by determining whether a portion of the eccentricity of the quill shaft is added to or subtracted from the distance between the center lines of the quill shaft 174 and the crank pin 160. Thus, the volumetric displacement of the meter for each revolution of the crank shaft can be easily adjusted by removing the pin 220, turning the disc 212 slightly relative to the disc 214, and then replacing the pin to lock the discs together, thereby causing the quill shaft and crank shaft to revolve together.

Directly above the adjustment discs 212 and 214 the shell 76 is provided with a hand hole closed by a threaded cap 222. With this cap removed, the fingers can be inserted through the hand hole to adjust the meter as previously described.

The register drive 208 has its upper end secured to a drive disc 224 which revolves therewith. This disc 224 is provided with an upwardly projecting off-center pin 226 adapted to fit into a slot 227 in a slotted driven disc 228 secured to the lower end of a register intermediate shaft 230. This shaft 230 is arranged in alignment with the register drive 208 and passes through a stuffing box 232 in the shell 76. Above the shell 76, the intermediate shaft 230 is connected by means of an easily separable pin and slot type universal joint 234 to a register shaft 236 which leads to and drives the register mechanism 46. Thus, as the meter crank shaft and quill shaft revolve together, the register shaft 236 is driven through the gear train 210 and above mechanism at the rate of one revolution of the register shaft 236 for each revolution of the crank shaft 172.

For convenience in describing the valve action of the meter, reference is had to Figs. 8 to 12. In these figures, the cylinders are separately indicated by the letters, A, B and C, while the numerals indicating the several elements associated with these cylinders are given like suffixes in lower case. Thus, cylinder A has piston 134a, passage 110a and port 112a, while the similar elements associated with cylinder B are indicated as 134b, 110b and 112b. Each successive figure from 8 to 12 represents the positions taken by the parts after successive rotational advancements of the crank shaft through an arc of 30°. In the figures the position of each piston is shown and its direction of movement indicated by an arrow, and for purposes of comparison, the inner and outer dead center positions of each piston are shown in broken lines. In order to avoid confusion in these figures, the crank shaft, connecting rods and rocker arms are not shown, but it will be understood that they are arranged and connected as previously described. In the following description of the valve action, it is assumed that pump 18 is operating and that consequently the meter housing 32 is filled with gasoline under approximately twenty pounds per square inch pressure and that this pressure bears equally against the external faces of all of the pistons 134. It is also assumed that valve 54 is open to permit gasoline to flow freely from the meter outlet connection 66.

Referring to Fig. 8 as an arbitrary starting point, the piston 134a in cylinder A is at its inner dead center position and hence has no substantial movement in either direction during a short time interval. During this short interval the port 112a connected to cylinder A by passage 110a is closed by the slide valve 190 so that no liquid flows either into or out of this cylinder. At this same instant, the slide valve 190 is so positioned that the inner edge of port 112b is uncovered and consequently communication is established between cylinder B and the outlet port 108. Since the pressure within the outlet port 108 is low, it being open to the atmosphere through the nozzle 34 and connecting hose and fittings, while the pressure upon the exterior surface of the piston 134b is at twenty pounds per square inch, it will be seen that the piston 134b will be forced inwardly. This inward movement of the piston 134b discharges the gasoline in the cylinder B through passage 110b, port 112b and into the outlet passage through outlet port 108. Simultaneously the inward movement of this piston rocks the upper end of its associated rocker arm 124, see Fig. 3, outwardly and thus by means of its connecting rod 150 and the spider 158 causes the crank shaft to be rotated in a counterclockwise direction. Meanwhile, the position of the slide valve is such that port 112c associated with cylinder C is open to the space within the housing 32 and thus the pressure on both sides of piston 134c is the same. The rotation of the crank shaft therefore easily pulls this piston 134c outwardly and draws a charge of gasoline into this cylinder through port 112c and passage 110c.

From the above it will be seen that cylinder C is being filled, cylinder B is emptying into the outlet passage and cylinder A is on dead center and is neither emptying nor filling. It will also be seen that the crank shaft is being rotated in a counterclockwise direction to bring the parts to the position shown in Fig. 9.

In Fig. 9 the parts are shown in the position they assume after the crank shaft has been rotated through an arc of 30° from the position shown in Fig. 8. During this period, the pin 182 has moved the slide valve 190 in a counterclockwise direction into the position illustrated and has uncovered the outer edge of port 112a, thus establishing communication between the interior of the housing 32 and the interior of cylinder A. The crank shaft is no longer on its dead center position with respect to piston 134a but has started the movement of this piston outwardly, thus drawing gasoline into cylinder A through passage 110a and port 112a. In the position shown in Fig. 9, cylinder A is therefore being filled with gasoline. During this same time interval, port 112b has been opened to a somewhat greater extent, while port 112c has been closed somewhat. It will be seen, therefore, that with the parts in the position shown in Fig. 9, piston 134b is moving inwardly and furnishing the power to rotate the crank shaft, and the crank shaft in turn is drawing pistons 134c and 134a outwardly, thus filling the cylinders A and C with gasoline.

Referring to Fig. 10, which represents the position assumed by the parts when the crank shaft has been rotated an additional 30°, piston 134c has reached its outward dead center position, and port 112c has been closed. Cylinder C is, therefore, filled with gasoline to be discharged into the outlet port 108 upon slight additional rotation of the crank shaft. Ports 112a and 112b are still open to the interior of the housing 32 and the outlet port 108, respectively. Cylinder A is, therefore, continuing to be filled with gasoline while piston 134b in cylinder B is continuing to supply the power for rotating the crank shaft.

In Fig. 11 the additional 30° movement of the crank shaft is seen to have displaced valve 190 sufficiently to uncover the interor edge of port 112c. Communication is, therefore, established between the interior of cylinder C and outlet port 108. Although this additional movement of the valve 190 has changed the area of the uncovered portions of ports 112a and 112b, port 112a is nevertheless still open to the interior of the housing 32, while port 112b is still in communication with the outlet port 108. Power to rotate the crank shaft when the parts are in the position shown in Fig. 11 is being furnished by the pistons in cylinders B and C, while the crank shaft is pulling piston 134a outwardly, thus continuing to fill cylinder A with gasoline. In Fig. 11 piston 134b is approaching its inner dead center position, while piston 134c is just beginning to recede from its outer dead center position.

In Fig. 12 an additional 30° movement of the crank shaft is seen to have brought piston 134b to its inner dead center position with valve 190 completely closing port 112b. Piston 134a is continuing its outward movement, thereby continuing to fill cylinder A with gasoline, while piston 134c is continuing its inward movement, thereby discharging the gasoline in cylinder C through ports 112c and 108. Since Fig. 12 shows the positions assumed by the parts after the crank shaft has rotated through an arc of 120° from the position shown in Fig. 8, and since the cylinders A, B and C are spaced 120° apart, it will be seen that the positions of the pistons shown in Fig. 12 is exactly the same as that shown in Fig. 8, excepting that in Fig. 12 piston 134b is at its inner dead center position, while in Fig. 8, piston 134a is at its inner dead center position. In other words, if Fig. 12 is rotated 120° in a clockwise direction, it will be the exact duplicate of Fig. 8. An additional advance of the crank shaft from the position shown in Fig. 12 will start a new cycle which will be the duplicate of that shown in Figs. 9, 10 and 11, excepting that, as pointed out above, the parts associated with cylinder A will take the positions assumed in these figures by the similar parts associated with cylinder C.

From the above description, it follows that the pistons 134 are either on dead center in which case no substantial motion takes place, or else they are moving inwardly or outwardly. If they are moving inwardly, it is because the pressure on the outer face of piston 134 is greater than that on the inner face and consequently the movement of the piston inwardly will take up whatever lost motion there is in the linkage between the piston and the crank shaft. If the piston is moving outwardly, the valve arrangement is such that the pressure on both sides of the piston is the same and the piston is being drawn outwardly by means of the linkage mentioned above. In either of these cases, any lost motion in the linkage is always taken up in the same direction and the connecting rods 150 are always under tension. Any lost motion in the linkage will not, therefore, affect the volumetric displacement of the meter and, consequently the meter will register accurately even though the parts have been subjected to considerable wear.

While the gasoline is within the housing 32, air, vapor and other gases mixed with the gasoline rise to the top of the housing and pass outwardly through the opening in the boss 98 and into the gasoline recovery apparatus 48. This recovery apparatus comprises a fitting 240 threaded into the boss 98 and having a passage 242 extending vertically therethrough. At the lower end of this passage, a cylindrical recess 244 is formed within which an excessive flow check valve 246 is provided. This valve consists of an axially movable plunger 248 urged downwardly by gravity and by a light coil spring 250. The upper end of this plunger has a conical surface 252 adapted to seat in a complementary valve seat 254 formed in the fitting. The plunger extends through and is secured to a washer 256 which has an external diameter slightly less than the internal diameter of the recess. The purpose of this washer is to restrict the free flow of gasoline through the recess and passage 242 so that a substantial flow of gasoline therethrough will impinge against the lower surface of the washer with sufficient force to overcome the spring and the weight of the plunger and thus push the plunger upwardly to close the excessive flow check valve. With proper adjustment of the spring pressure, the excessive flow check valve will permit a free flow of air and other gases therethrough, but will be quickly closed as soon as all of the air has passed from the housing 32 and gasoline is beginning to flow along the passage 242.

In order to permit a small rate of flow of either air or gasoline through the passage 242 when the check valve is closed, the plunger has a small diameter bore 258 extending axially inwardly from its upper end and intersecting a larger bore 260 extending transversely through the plunger. In the interest of manufacturing economy the bore 258 is drilled to a size larger than necessary and then a wire 262 is inserted into the bore to control the rate of flow therethrough. This wire is anchored by bending its lower end where it projects into the transverse bore 260.

The upper end of the fitting 240 is in communication with a gasoline recovery chamber 264 vented to the atmosphere at the top through the vent tube 50. Within the chamber 264, a float valve 266 is provided to shut off the free flow of gasoline and air from the passage 242 whenever gasoline within the chamber 264 rises above a predetermined level. This float valve is comprised of an upper fitting 268 having a recess 270 therein communicating with the passage 242 in the lower fitting 240. A small pressure relief vent 272 is provided through the side wall of the upper fitting 268 to permit a restricted rate of flow from the recess 270 to the chamber 264. Although this pressure relief vent 272 is small, it is designed to permit a more rapid rate of flow therethrough than is possible through the small bore 258 in the plunger 248. At the upper end of the fitting 268 a valve seat 274 is formed surrounding a passage 276 and communicates with the interior of the chamber 264 by means of a transverse bore 278 extending through the fitting. This passage 276 is adapted to be closed by a conical valve 280 positioned below the valve seat 274 and connected to a valve stem 282 projecting upwardly through the fitting and carrying a float 284 at its upper end.

Under normal operating conditions this float valve is open, but if for any reason the excessive flow check valve 246 should fail to close, the float valve 266 will be closed when the chamber 264 becomes sufficiently full of gasoline to lift the float upwardly and bring the valve 280 against its seat 274.

The recovery chamber 264 is equipped with a sump 286 which collects gasoline finding its way into the chamber. At a low point in this sump, a threaded opening 288 is provided which communicates with the intake side 56 of the pump 18 through the gasoline return tube 52. In order to prevent air and other gases from returning to the intake side of the pump through this tube 52, a gasoline return float valve 289 is positioned within the sump to close the opening 288 until such a time as the gasoline within the sump has risen to a predetermined level.

The gasoline return float valve 289 comprises a vertical rod 290 attached to a float 292 surrounding its mid-portion and having a conical shaped lower end 294. This lower end 294 extends into a cylindrical recess 296 in a fitting 298 threaded into the opening 288 from its upper side. The bottom portion of this recess 296 is formed as a valve seat 300 which cooperates with the conical end of the rod 290 when it contacts therewith to prevent flow from the interior of the recess 296 through an opening 302 extending through the valve seat 300 and communicating with the return tube 52. An opening 304 through the side wall of the fitting 298 is provided just above the valve seat 300 to permit gasoline within the sump 286 to flow into the recess 296. The annular wall of the fitting 298 which extends upwardly and forms the recess 296 serves as a guide to prevent lateral displacement of the lower end of the rod 290 when the rod is lifted by the float 292. The upper end of this rod extends through a hole 306 in a guide plate 308 secured to the top of the sump by screws 310 and thus lateral displacement of the top of the rod and consequent binding of its lower end in the recess 296 is prevented. The guide plate 308 in conjunction with a pin 312 extending transversely through a hole in the rod 290 also acts as a stop to prevent the float 292 from lifting the lower end of the rod above the top of its guide in the fitting 289. To aid in assembly and disassembly of the float 292 relative to the rod 290, and to permit the use of floats varying somewhat in length, the parts are so formed that the float can be slipped over the upper end of the rod and slid thereon until its lower end abuts against a washer 314 resting upon a shoulder 316 formed upon the rod 290. Two washers 318 with a coil spring 320 therebetween are slipped over the upper end of the rod and the upper washer pressed downwardly to compress the spring 320 sufficiently to permit the pin 312 to be inserted through the hole in the rod 290. This construction permits the pin 312 to act as a retainer for floats having considerable variation in size while still permitting the pin to have a definite location so that it may act as a stop to limit the upward movement of the rod 290.

As a starting point in the description of the gasoline recovery apparatus it is assumed that the pump 18 is not running and that therefore the housing 32 may be only partially filled with gasoline, the remaining space being taken up by air and gasoline vapor. It is also assumed that the inside of the housing 32 is at atmospheric pressure. Under these conditions the plunger 248 of the excessive flow check valve 246 is in its downward position. The space within the housing 32 is therefore vented to the atmosphere through the excessive flow check valve 246, float valve 266, chamber 264 and vent pipe 50. Since both of the valves mentioned are open, the flow of gas and air from the housing 32 to the atmosphere is comparatively unrestricted.

If now the pump 18 is started, as at the beginning of a dispensing operation, the pressure within the housing 32 will be quickly built up, thus forcing the air and vapor within the housing 32 through the excessive flow check valve and into the chamber 264. When all of the air and vapor have been forced from the housing 32, the flow of gasoline through the excessive flow check valve will produce sufficient drag on the washer 256 to urge the plunger 248 upwardly and close the valve in the manner previously described. Thus, rapid flow of gasoline into the chamber 264 is prevented.

As air and vapor continue to separate from the gasoline within the housing 32 they, along with a relatively small quantity of gasoline, pass through the small bore 258, passage 242, float valve 266 and into the chamber 264. Within the chamber 264, the vapor and air separate from the gasoline and pass outwardly through the vent tube 50, while the gasoline collects in the sump 286 until it reaches such a level that the float 292 raises the rod 290, thus opening the valve 289 and permitting the gasoline to flow back to the intake side of the pump 18. At the end of the pumping operation, gasoline continues to leak through the small bore 258 until the pressure within the housing 32 drops sufficiently to permit the spring 246 to open the excessive flow check valve, thus putting the apparatus in condition for a new cycle.

If for any reason the excessive flow check valve 246 should stick open, and gasoline flows into the chamber 264 faster than it can be drained therefrom through the valve 289, the rising gasoline will lift the float 284 and close the float valve 266. The closure of this valve restricts the flow of gasoline into the chamber 264 to that which can flow through the small vent 272. Since this vent is considerably smaller than the opening through the valve 289, the gasoline is returned to the pump more rapidly than it can flow into the chamber and the chamber thus prevented from overflowing.

From the above description it will be seen that the separation of air and vapor from the gasoline takes place within the meter housing itself and that this air and vapor is conducted to the atmosphere. If there is a large quantity of air and vapor, it is conducted to the atmosphere quickly, while if there is a small quantity, as is normally the case during a dispensing operation, this small quantity is conducted slowly to a separating chamber and thus has sufficient time to separate from gasoline carried along before passing to the atmosphere, thereby permitting substantially complete recovery of the liquid gasoline. It will also be seen that my device incorporates safety features that prevent overflow of the apparatus in the event that the excessive flow check valve does not close, but that such safety features do not prevent continued venting of vapor and air to the atmosphere even though they are brought into operation to prevent overflow of the apparatus.

The principal service difficulty encountered in automobile service station gasoline meters is the formation of gums and resins which in time necessitate cleaning of the moving parts. Service difficulties of this type are aggravated by conditions calling for comparatively infrequent operation of the dispensing equipment, since under these conditions the gum is formed faster than it can be worn away. For this reason I prefer that the meter described have a comparatively small volumetric capacity for each revolution of its crankshaft. With this in view, the meter shown is designed to make twenty revolutions for each gallon of gasoline passing therethrough. It has been found that the average quantity of gasoline dispensed to each customer is about 4.7 gallons and therefore, that on the average, the meter here shown and described will make about 94 revolutions each time it is used, with the result that the working surfaces are kept well cleaned and polished at all times excepting when the meter is operated under extremely adverse conditions.

Attention is called to the orbital movement of the valve slide which causes all points of the slide to describe circles of equal size. Thus the wear at all points on the triangular slide face is uniform and the valve therefore does not require frequent regrinding in order to insure liquid tightness. This valve arrangement also automatically provides a back pressure surge release. The back pressure referred to is usually brought about by quick closing of the valve 54. When this occurs, the surge of moving gasoline momentarily builds up a pressure in the hose 42 and connecting piping above that ordinarily delivered by the pump 18. Under these conditions, the gasoline pressure raises valve 190 from its seat against the pressure of spring 204 and the excessive pressure is released into the housing 32 where it is quickly dissipated into the gasoline recovery mechanism 48. After the pressure has dropped sufficiently, the valve is again seated by the spring 204.

When after extended use it is desired to inspect the gasoline meter working parts, the entire working mechanism of the meter can be removed from the housing 32 in one piece. After this unit has been removed, the condition of the cylinder walls, valve parts and other members can be readily inspected for gum deposits without taking the meter apart, since the parts, including the cylinders and valve, are open to view. When more complete disassembly is necessary, this can be accomplished on a bench or in some other convenient place rather than within the pump casing.

Since commercial gasoline is somewhat corrosive, I prefer that such parts as the balls at the ends of the connecting rods and the pin that drives the valve slide be made of nitralloy and that the frame castings and crank shaft be of chrome nickel steel. Such parts as the valve slide and several bushings are preferably formed of bronze.

Having described my invention, what I claim as new and useful and desire to secure by Letters Patent of the United States is:

1. In a gasoline dispensing system, a housing forming a chamber, said chamber having inlet and outlet openings, a gasoline meter disposed in the housing and removably secured thereto, means connecting the outlet side of said meter directly to said outlet opening, said meter having a plurality of cylinders arranged with their center lines extending radially outwardly from a central position with the outward ends of said cylinders being open to the space within said housing.

2. In a gasoline dispensing system, a housing forming a chamber, said chamber having inlet and outlet openings, a gasoline meter disposed in the housing and removably secured thereto, means connecting said meter to said outlet opening, said meter having a plurality of radially arranged cylinders with the outward ends of said cylinders being open to the space within the housing, a crankshaft, pistons in said cylinders, and means including rocker arms to drive the crankshaft from the pistons.

3. In a gasoline dispensing system, a housing forming a chamber, said chamber having inlet and outlet openings, a gasoline meter disposed in the housing and removably secured thereto, means connecting said meter to said outlet opening, said meter having a plurality of radially arranged cylinders with the outward ends of said cylinders being open to the space within said housing, a crankshaft, pistons in said cylinders, means including rocker arms to drive the crankshaft from the pistons, valve means selectively to connect the interior of each of the cylinders to the outlet opening or to the interior of said chamber, and means associated with the crankshaft to move said valve means.

4. In a gasoline dispensing system, a housing forming a chamber, said chamber having inlet and outlet openings, a gasoline meter disposed in the housing and removably secured thereto, said meter having a plurality of cylinders arranged with their center lines extending radially outwardly from a central position with the outward ends of said cylinders being open to the space within said housing, an outlet port connected to said outlet opening, a plurality of other ports connected to the inner ends of said cylinders, pistons in said cylinders, crankshaft means revolved by movement of said pistons, valve means selectively to connect said other ports to the space within said housing or to the outlet port and crankshaft driven means to shift said valve means in timed relation to the positions of said pistons.

5. A radial meter comprising a housing, a plurality of radially arranged cylinders positioned within the housing, said cylinders having their outward ends open to the space within the housing, pistons in said cylinders, rocker arms pivotally connected to said pistons, a crankshaft, means including connecting rods connecting said rocker arms to said crankshaft, said housing having an inlet connection adapted to be connected to a fluid pressure source so that fluid under pressure forced into said housing will be confined by said housing and will produce a pressure on the outer ends of said pistons, thus tending to move said pistons inwardly, said housing also having an outlet connection, and valve means operated by said crankshaft adapted selectively to connect the inner ends of said cylinders in rotation to said outlet or alternatively to connect the inner ends of said cylinders to the space within said housing.

6. In a fluid meter, a plurality of radially arranged cylinders, pistons disposed to reciprocate in the cylinders, rocker arms pivotally mounted beyond the outward ends of the cylinders, connecting means to rock said rocker arms as said pistons reciprocate, a centrally disposed crankshaft including a crank pin offset from the center line thereof, a member journaled on the crank pin, connecting rods to drive said crank shaft from said rocker arms, and ball and socket means connecting the connecting rods to said member and to said rocker arms.

7. In a fluid meter, a plurality of radially arranged cylinders, pistons disposed to reciprocate in the cylinders, rocker arms pivotally mounted beyond the outward ends of the cylinders, connecting means to rock said rocker arms as said pistons reciprocate, a centrally disposed crankshaft including a crank pin offset from the center line thereof, a member journaled on the crank pin, connecting rods to drive said crankshaft from said rocker arms, the ends of said connecting rods being shaped as balls, and said rocker arms and said member having sockets therein to embrace said balls.

8. A fluid meter comprising a plurality of radially arranged cylinders with their center lines extending radially outwardly from a central position, pistons positioned to reciprocate in said cylinders, a centrally located crankshaft, a spider journaled on said crankshaft, rocker arms pivotally connected at one end to said pistons, and connecting rods extending between the other ends of said rocker arms and said spider.

9. A fluid meter comprising a plurality of radially arranged cylinders with their center lines extending radially outwardly from a central position, pistons positioned to reciprocate in said cylinders, a centrally located crankshaft, a spider journaled on said crankshaft, rocker arms pivotally connected at one end to said pistons, and connecting rods extending between the other ends of said rocker arms and said spider, said connecting rods having balls at each of their ends to form ball and socket joints with sockets formed in the spider and rocker arms.

10. A fluid meter comprising three radially arranged cylinders with their center lines extending radially from a common position, a plane valve surface located at the inner ends of said cylinders, said valve surface having a central triangular outlet port surrounded by three combination inlet and outlet ports, conduit means connecting the inner end of each of the cylinders to one of the combination inlet and outlet ports, a hollow triangular valve slide in contact with the valve face and movable to uncover the outer edge of any of the combination inlet and outlet ports or to connect the combination inlet and outlet ports to the outlet port, a centrally disposed crank shaft, said crank shaft being connected to actuate said valve slide, pistons in said cylinders, and means including rocker arms to drive the crank shaft from the pistons.

11. In a gasoline metering device, a meter having a plurality of radially arranged cylinders with the axes of said cylinders radiating from a central position, the outer ends of said cylinders being open, a crank shaft, pistons in said cylinders, and means including rocker arms to drive the crank shaft from the pistons, and means forming a chamber surrounding said meter, said chamber being adapted to be connected to a source of fluid under pressure.

ROSS EUGENE RISSER, Jr.